United States Patent
Harada et al.

(10) Patent No.: US 12,532,257 B2
(45) Date of Patent: Jan. 20, 2026

(54) TERMINAL AND COMMUNICATION METHOD

(71) Applicant: NTT DOCOMO, INC., Tokyo (JP)

(72) Inventors: Kouhei Harada, Tokyo (JP); Akihito Hanaki, Tokyo (JP); Keisuke Saito, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 313 days.

(21) Appl. No.: 18/274,117

(22) PCT Filed: Mar. 11, 2021

(86) PCT No.: PCT/JP2021/009937
§ 371 (c)(1),
(2) Date: Jul. 25, 2023

(87) PCT Pub. No.: WO2022/190335
PCT Pub. Date: Sep. 15, 2022

(65) Prior Publication Data
US 2024/0430796 A1 Dec. 26, 2024

(51) Int. Cl.
*H04W 52/02* (2009.01)
*H04W 56/00* (2009.01)
*H04W 72/02* (2009.01)
*H04W 76/20* (2018.01)

(52) U.S. Cl.
CPC ..... *H04W 52/0212* (2013.01); *H04W 56/001* (2013.01); *H04W 72/02* (2013.01); *H04W 76/20* (2018.02)

(58) Field of Classification Search
CPC ........... H04W 52/0212; H04W 56/001; H04W 72/02; H04W 76/20; H04W 72/04; H04W 76/15; H04W 76/36
See application file for complete search history.

(56) References Cited

U.S. PATENT DOCUMENTS

| | | | |
|---|---|---|---|
| 2020/0146059 A1 | 5/2020 | Cirik et al. | |
| 2021/0067292 A1 | 3/2021 | Liu et al. | |
| 2022/0030659 A1* | 1/2022 | Kim | H04W 28/06 |
| 2022/0046522 A1* | 2/2022 | Kim | H04W 48/16 |
| 2022/0225453 A1* | 7/2022 | Kim | H04W 76/20 |

(Continued)

OTHER PUBLICATIONS

Office Action issued in Japanese Patent Application No. 2023-505027, dated Nov. 19, 2024 (6 pages).

(Continued)

*Primary Examiner* — Kyaw Z Soe
(74) *Attorney, Agent, or Firm* — Osha Bergman Watanabe & Burton LLP (57) ABSTRACT

A terminal includes a communication unit configured to perform communication to which dual connectivity is applied with a base station, a receiving unit configured to receive, from the base station, signaling indicating an indication to perform activation of a secondary cell group and signaling indicating an indication to perform deactivation of the secondary cell group, and a control unit configured to perform the deactivation of the secondary cell group and perform switching to a band including a synchronization signal, in a case where the receiving unit receives the signaling indicating the indication to perform the deactivation of the secondary cell group.

4 Claims, 6 Drawing Sheets

(56) References Cited

U.S. PATENT DOCUMENTS

2022/0322418 A1* 10/2022 Kim ................... H04W 28/18

OTHER PUBLICATIONS

Office Action issued in Japanese Patent Application No. 2023-505027, issued Apr. 22, 2025 (5 pages).
3GPP TSG-RAN WG2 Meeting #109 electronic; R2-2000314; OPPO; "Email report [108#56][DCCA] Scell Dormancy Open Issues (OPPO)"; Feb. 24-Mar. 6, 2020 (14 pages).
International Search Report issued in PCT/JP2021/009937 on Oct. 26, 2021 (3 pages).
Written Opinion of the International Searching Authority issued in PCT/JP2021/009937 on Oct. 26, 2021 (4 pages).
InterDigital Inc.; "On Support of Activation/Deactivation for SCG"; 3GPP RAN WG2 Meeting #113-e, R2-2101312; Electronic; Jan. 25-Feb. 5, 2021 (6 pages).
Huawei; "[AT113-e][230][eDCCA] Solution alternatives for SCG activation and deactivation (Huawei)"; 3GPP TSG-RAN WG2#113-e, R2-2101966; Online; Jan. 25-Feb. 5, 2021 (41 pages).
3GPP TS 38.300 V16.4.0; "3rd Generation Partnership Project; Technical Specification Group Radio Access Network; NR; NR and NG-RAN Overall Description; Stage 2 (Release 16)"; Dec. 2020 (149 pages).
3GPP TS 37.340 V16.4.0; "3rd Generation Partnership Project; Technical Specification Group Radio Access Network; Evolved Universal Terrestrial Radio Access (E-UTRA) and NR; Multi-connectivity; Stage 2 (Release 16)"; Dec. 2020 (84 pages).
Office Action issued in Japanese Patent Application No. 2023-505027, mailed on Sep. 16, 2025 (5 pages).
Huawei, HiSilicon; "Discussion on CSSF for inter-RAT measurement, SCell activation delay and cell identification requirements on deactivated SCell in Rel-15"; 3GPP TSG-RAN WG4 Meeting #98-e, R4-2102737; Electronic Meeting; Jan. 25-Feb. 5, 2021 (9 pages).

* cited by examiner

TERMINAL AND COMMUNICATION METHOD

FIELD OF THE INVENTION

The present invention relates to a terminal and a communication method in a wireless communication system.

BACKGROUND OF THE INVENTION

In 3GPP (3rd Generation Partnership Project), a wireless communication scheme called "5G" or "NR" (New Radio) is being discussed in order to realize further increase of system capacity, further increase of data transmission speed, and further decrease of delay in wireless sections (hereinafter this new communication scheme will be referred to as "NR"). In 5G, various wireless technologies and network architectures are being discussed in order to satisfy the requirements of achieving a throughput of 10 Gbps or more and keeping the delay in wireless sections to 1 ms or less (see, for example, Non-Patent Document 1).

In addition, in 3GPP standardization, a secondary cell group activation/deactivation function in dual connectivity operation (see, for example, Non-Patent Document 2) is being discussed, with the main purpose of reducing terminal power consumption. For example, operations that are not performed in a state in which the secondary cell group is deactivated are specified to reduce power consumption.

RELATED-ART DOCUMENTS

Non-Patent Documents

[Non-Patent Document 1] 3GPP TS 38.300 V16.4.0 (2020-12)
[Non-Patent Document 2] 3GPP TS 37.340 V16.4.0 (2020-12)

SUMMARY OF THE INVENTION

Technical Problem

In a case where a terminal skips a random access procedure and performs re-activation of a secondary cell group in a state in which the secondary cell group is in a deactivated state, the downlink synchronization needs to have been established during the state in which the secondary cell group is in a deactivated state. However, depending on a band used by the terminal in the secondary cell group, a signal necessary for the downlink synchronization is not necessarily received during the state in which the secondary cell group is in a deactivated state.

The present invention has been made in view of the above, and it is therefore an object of the present invention to reduce the delay when performing secondary cell group re-activation during the dual connectivity communication in a wireless communication system.

Solution to Problem

According to the disclosed technique, a terminal is provided. The terminal includes: a communication unit configured to perform communication to which dual connectivity is applied with a base station; a receiving unit configured to receive, from the base station, signaling indicating an indication to perform activation of a secondary cell group and signaling indicating an indication to perform deactivation of the secondary cell group; and a control unit configured to perform the deactivation of the secondary cell group and perform switching to a band including a synchronization signal, in a case where the receiving unit receives the signaling indicating the indication to perform the deactivation of the secondary cell group.

Advantageous Effects of Invention

This disclosure provides a technique for reducing a delay when performing secondary cell group re-activation during the dual connectivity communication in a wireless communication system.

DETAILED DESCRIPTION OF THE PREFERRED EMBODIMENTS

Hereinafter, an embodiment of the present invention will be described with reference to the accompanying drawings. The embodiment described below is an example, and the embodiments to which the present invention can be applied are not limited to the following embodiment.

In an operation of a wireless communication system according to the embodiment of the present invention, conventional techniques may be used as appropriate. The conventional techniques include, but are not limited to, for example, conventional NR and LTE.

Figure 1:
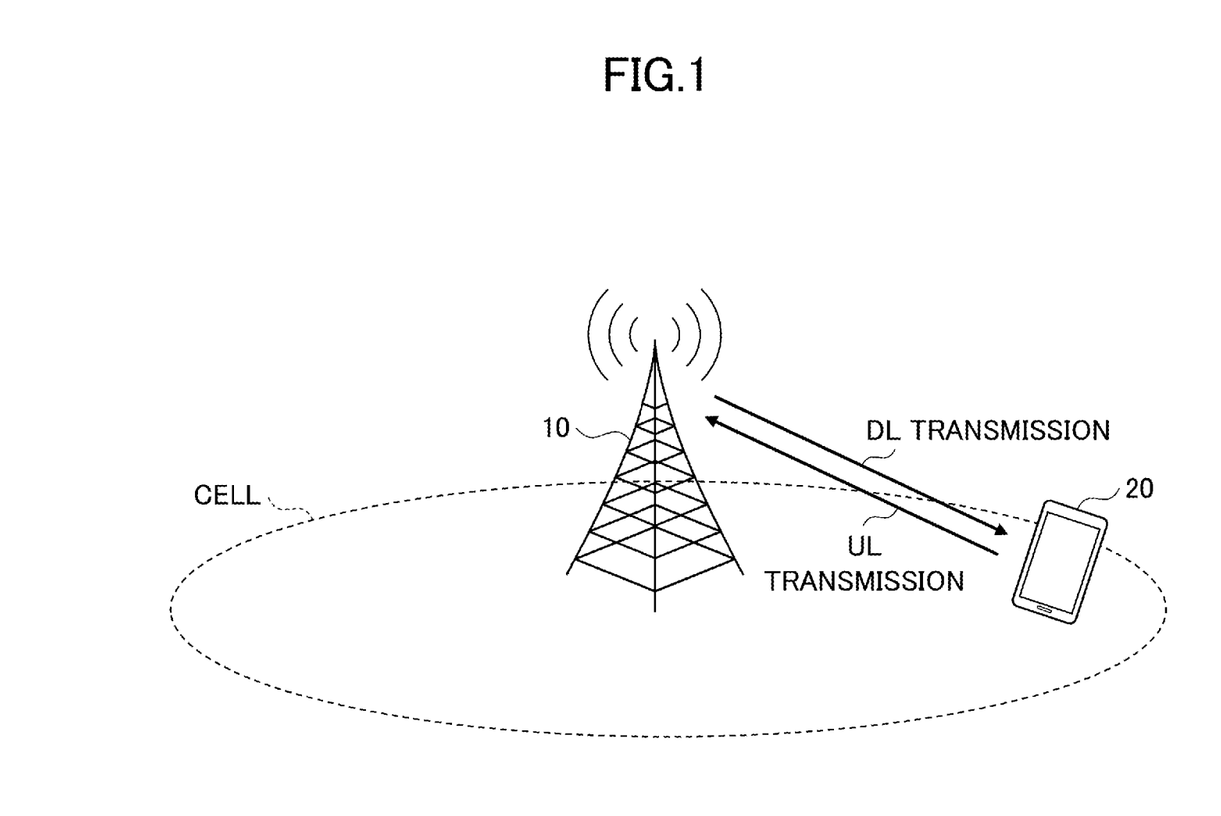
FIG. 1 is a diagram illustrating a wireless communication system example (1) according to an embodiment of the present invention.

FIG. 1 is a diagram illustrating a wireless communication system example (1) according to the embodiment of the present invention. The wireless communication system according to the embodiment of the present invention includes a base station 10 and a terminal 20, as illustrated in FIG. 1. In FIG. 1, one base station 10 and one terminal 20 are illustrated, but this is an example, and there may be more than one of each.

The base station 10 is a communication device that provides one or more cells and performs wireless communication with the terminal 20. The physical resources of radio signals are defined in the time domain and the frequency domain. The time domain resources may be defined or referred to as OFDM symbols, and the frequency domain resources may be defined or referred to as sub-carriers or resource blocks. The TTI (Transmission Time Interval) in the time domain may be a slot, or the TTI may be a subframe.

The base station 10 can perform carrier aggregation to communicate with the terminal 20 by bundling multiple cells (multiple CCs (Component Carriers)). Carrier aggregation uses one PCell (Primary Cell) and one or more SCells (Secondary Cells).

The base station 10 transmits synchronization signals and system information to the terminal 20. The synchronization signals are, for example, NR-PSS and NR-SSS. The system information is transmitted, for example, by NR-PBCH or PDSCH, and is also referred to as broadcast information. As illustrated in FIG. 1, the base station 10 transmits control signals or data in DL (Downlink) to the terminal 20 and receives control signals or data in UL (Uplink) from the terminal 20. Here, what is transmitted by a control channel such as PUCCH and PDCCH is referred to as a control signal, and what is transmitted by a shared channel such as PUSCH and PDSCH is referred to as data, but these names are only examples.

The terminal 20 is a communication device with wireless communication functions, such as a smartphone, a cellular phone, a tablet, a wearable terminal, and an M2M (Machine-to-Machine) communication module. As illustrated in FIG. 1, the terminal 20 utilizes various communication services provided by a wireless communication system by receiving control signals or data in DL from the base station 10 and transmitting control signals or data in UL to the base station 10. Note that the terminal 20 may be referred to as a UE, and the base station 10 may be referred to as a gNB.

Figure 2:
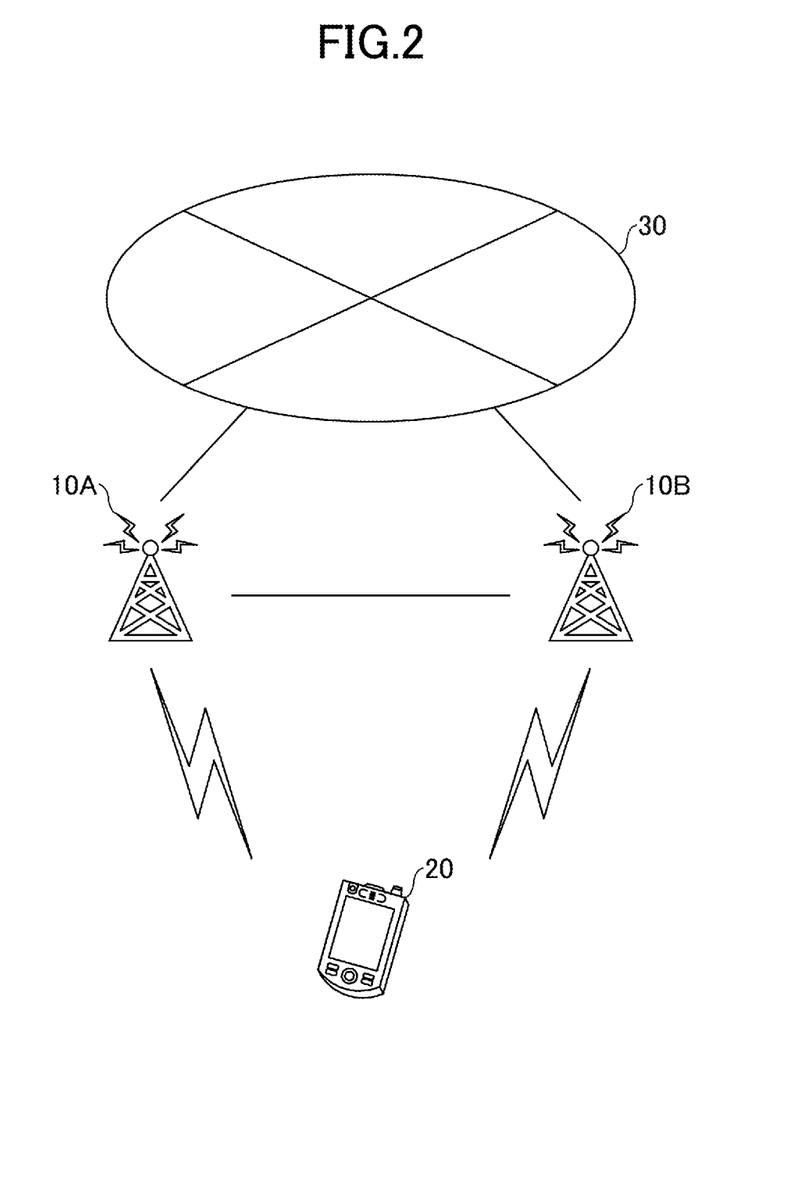
FIG. 2 is a diagram illustrating a wireless communication system example (2) according to the embodiment of the present invention.

FIG. 2 is a diagram illustrating a wireless communication system example (2) according to the embodiment of the present invention. FIG. 2 illustrates a configuration example of a wireless communication system when dual connectivity (DC) is executed. As illustrated in FIG. 2, there are provided a base station 10A serving as a master node (MN) and a base station 10B serving as a secondary node (SN). The base station 10A and the base station 10B are each connected to a core network 30. The terminal 20 can communicate with both the base station 10A and the base station 10B.

A cell group provided by the base station 10A serving as a MN is referred to as a master cell group (MCG), and a cell group provided by the base station 10B serving as an SN is referred to as a secondary cell group (SCG). In dual connectivity, an MCG includes one PCell and 0 or more SCells, and an SCG includes one PSCell (Primary SCG Cell) and 0 or more SCells.

Note that dual connectivity may be a communication method using two communication standards, and any communication standards may be combined. For example, the combination may be NR and 6G standards, or LTE and 6G standards. Furthermore, dual connectivity may be a communication method using three or more communication standards and may be called by other names different from dual connectivity.

The processing operation in the present embodiment may be executed by the system configuration illustrated in FIG. 1, may be executed by the system configuration illustrated in FIG. 2, or may be executed by a system configuration other than these.

In the 3GPP standardization, for the main purpose of reducing power consumption of terminals, a function of performing activation/deactivation of a secondary cell group in a dual connectivity operation has been discussed. For example, operations that are not performed when the secondary cell group is in a deactivated state are defined to reduce power consumption.

For example, in a case where the secondary cell group is activated, PDCCH monitoring, RRM (Radio Resource Management) measurement, RLM (Radio Link Monitoring), beam failure detection/recovery, CSI-RS (Channel State Information—Reference Signal) measurement and reporting, configuration of timing advance, SRS (Sounding Reference Signal) transmission are performed.

On the other hand, in a case where the secondary cell group is deactivated, for example, the PDCCH monitoring and the SRS transmission need not be performed.

Note that the RRM measurement is a measurement related to mobility such as handover and PSCell change. The RLM is monitoring for detecting DL out-of-synchronization. The beam failure detection/recovery is a function in which the terminal 20 detects beam failure and recovers. The timing advance is information for maintaining UL synchronization.

For example, the SCG activation may be requested by the MN, SN or UE. With respect to the SCG activation or the SCG deactivation, RRC (Radio Resource Control) signaling may be used between the MN and the UE or between the MN and the SN.

Furthermore, reducing a delay caused by performing a random access procedure when performing the SCG re-activation has been discussed. For example, an operation has been discussed in which the terminal 20 performs PDCCH monitoring in the PSCell with the minimum processing time without performing the random access procedure.

Here, in a case where the terminal skips the random access procedure and performs the SCG re-activation in a state in which the SCG is deactivated, the downlink synchronization needs to have been established during the state in which the SCG is deactivated. In particular, when DL synchronization by receiving an SSB is enabled, there is a possibility that the random access procedure can be skipped.

In addition, because the SCG activation is generally assumed to be performed when high-speed large-capacity communication is required, the communication is expected to be performed using a wideband during the time when the SCG is in an activated state in order to improve the throughput. It is also assumed, for example, that the communication is performed using a band that does not include SSBs during the time when the SCG is in an activated state.

On the other hand, during the time when the SCG is in a deactivated state, there is concern that sufficient frequency tracking performance need not be obtained for the wideband BWP by using SSBs alone. That is, there is a case where sufficient measurement performance cannot be obtained for the frequency band other than the measurement band including SSBs. In this case, even if the DL synchronization is maintained by receiving SSBs during the time when the SCG is in a deactivated state, there is a possibility that an attempt to receive a PDCCH in the band that does not include SSBs after performing the SCG activation need not be successful.

Therefore, in the SCG, a narrowband BWP that has the same band as the SSB band may be configured as a default BWP, and when the SCG is caused to transition to the deactivated state, the BWP may be switched to the default BWP. Note that the narrowband BWP that has the same band as the SSB band or the narrowband BWP in which at least SSBs are arranged may be configured as an initial BWP or as a first active BWP, and when the SCG is caused to transition to the deactivated state, the BWP may be switched to the initial BWP or the first active BWP.

The above-described BWP switching may be indicated from the network to the terminal 20 when the SCG is caused to transition to the deactivated state, or, as an operation configured in advance by using RRC signaling, the terminal may autonomously execute the above-described BWP switching when the SCG is caused to transition to the deactivated state.

Figure 3:
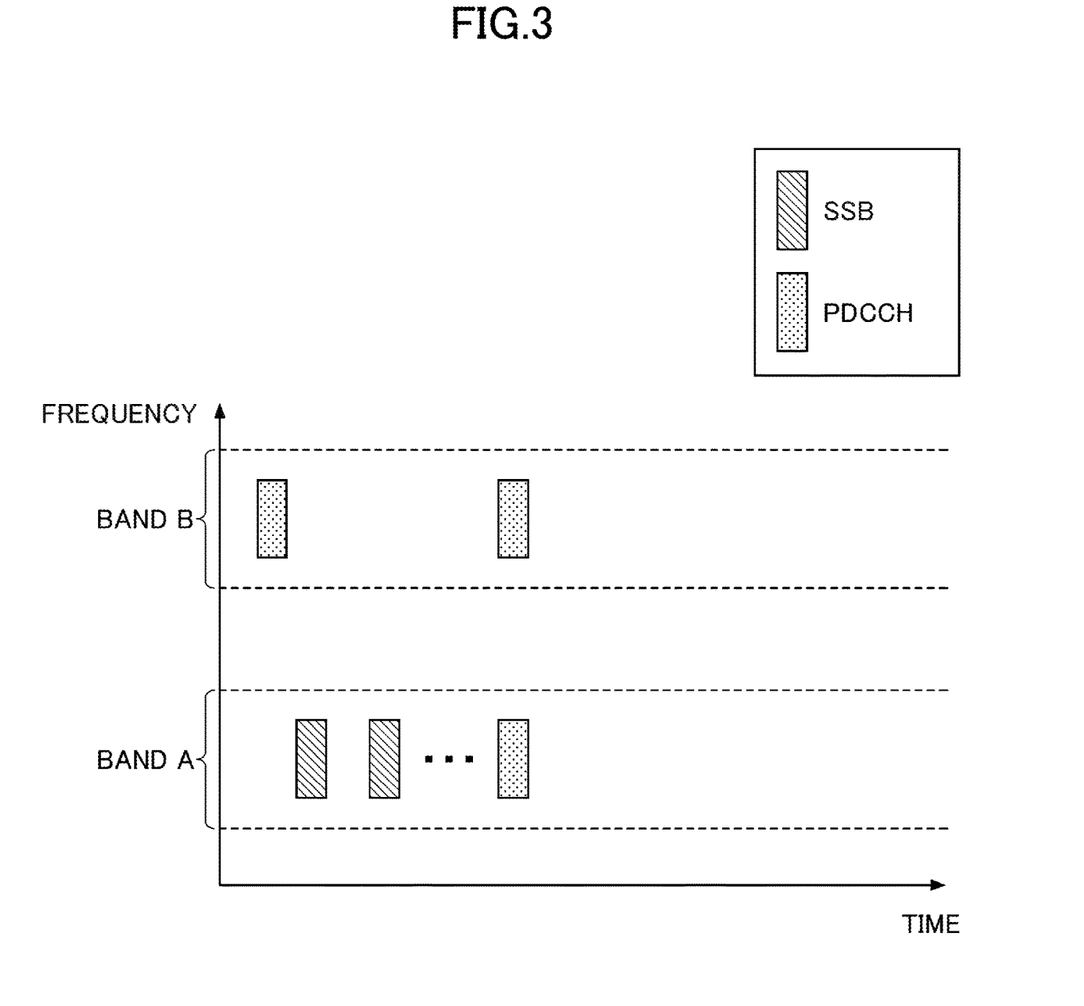
FIG. 3 is a diagram illustrating an SCG re-activation example according to the embodiment of the present invention.

FIG. 3 is a diagram illustrating an SCG re-activation example according to the embodiment of the present invention. FIG. 3 schematically illustrates the arrangement of SSBs and PDCCHs. For example, in the case where the DL synchronization is maintained by receiving SSBs during the time when the SCG is in a deactivated state, if PDCCH reception is attempted in a band that does not include SSBs such as a band B illustrated in FIG. 3 when the SCG is caused to transition to the activated state, there is a possibility that the PDCCH cannot be received because the frequency characteristics are different from a band A that is a measurement band.

Therefore, by switching the BWP to the band A that includes SSBs when the SCG is caused to transition to the deactivated state, it is possible to attempt the PDCCH reception in the BWP when the SCG is caused to transition to the activated state.

Note that in a case where the PDCCH reception is performed in the band B, the Doppler frequency shift estimation may be further performed by using TRS (Tracking RS) because the synchronization using SSBs is not necessarily sufficient.

In addition, the above-described BWP switching may be applied to the BWP in DL, and the terminal 20 may attempt PDCCH reception in the BWP including SSBs when the SCG is caused to transition to the activated state again. Furthermore, the above-described BWP switching may be applied to the BWP in UL, and the terminal 20 may attempt PUCCH transmission in the BWP including SSBs when the SCG is caused to transition to the activated state again. Hereinafter, operations in DL will be described, but the operations may also be performed in UL.

Figure 4:
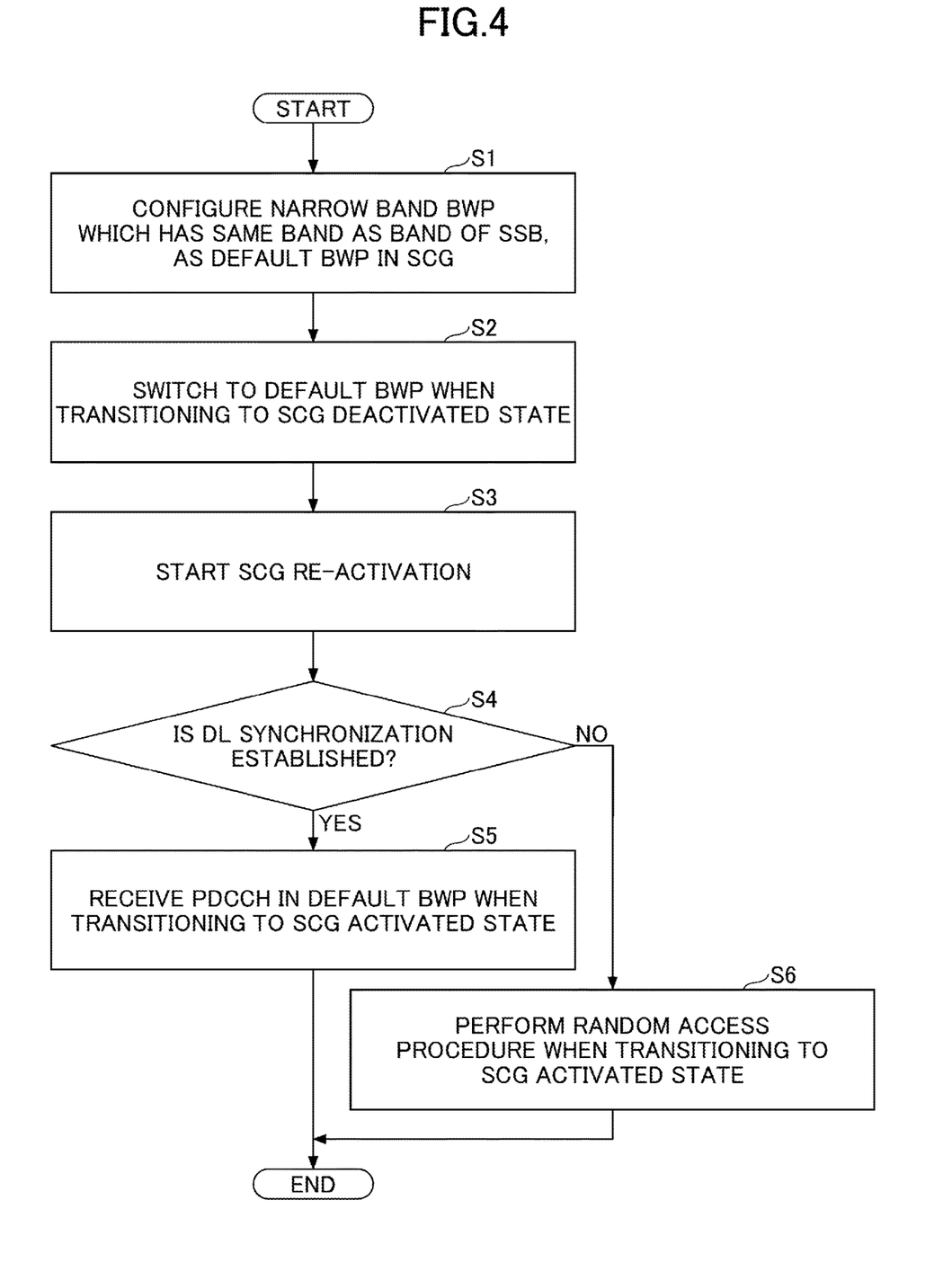
FIG. 4 is a sequence diagram illustrating the SCG re-activation example according to the embodiment of the present invention.

FIG. 4 is a sequence diagram illustrating the SCG re-activation example according to the embodiment of the present invention. In Step S1, the terminal 20 configures a narrowband BWP that has the same band as the SSB band or that includes the SSB band as a default BWP in the SCG. In subsequent Step S2, the terminal 20 switches the band to the default BWP when the SCG is caused to transition to the deactivated state. Step S2 may be performed autonomously by the terminal or may be performed as a result of an indication from the network.

In the subsequent Step S3, the terminal 20 starts the re-activation of the SCG. In the subsequent Step S4, the terminal 20 determines whether DL synchronization is established. In a case where the DL synchronization is established (YES in S4), the process proceeds to Step S5, and in a case where the DL synchronization is not established (NO in S4), the process proceeds to Step S6. In Step S5, when the SCG is caused to transition to the activated state, the terminal 20 receives a PDCCH in the default BWP. On the other hand, in Step S6, the terminal 20 performs the random access procedure when the SCG is caused to transition to the activated state.

Note that even in a case where the terminal 20 autonomously switches the band to the default BWP when the SCG is in a deactivated state in the sequence illustrated in FIG. 4, the network can transmit a PDCCH in the default BWP because the network knows that the terminal 20 has switched the band to the default BWP. In addition, in a case where switching to the wideband BWP is necessary, it is assumed that the base station 10 transmits a PDCCH for BWP switching to the terminal 20 in the narrowband BWP including SSBs.

According to the above-described embodiment, by switching beforehand the band to the narrowband BWP including SSBs when the SCG is caused to transition to the deactivated state, the terminal 20 can receive the PDCCH by skipping the random access procedure when the SCG is caused to transition to the activated state.

That is, in the wireless communication system, it is possible to reduce a delay when performing secondary cell group re-activation during the dual connectivity communication.

(Device Structure)

Next, an example functional structure of the base station 10 and the terminal 20 for performing the processes and operations described above will be described. The base station 10 and the terminal 20 include functions for executing the embodiment described above. However, each of the base stations 10 and the terminal 20 may include only part of the functions of the embodiment.

<Base Station 10>

Figure 5:
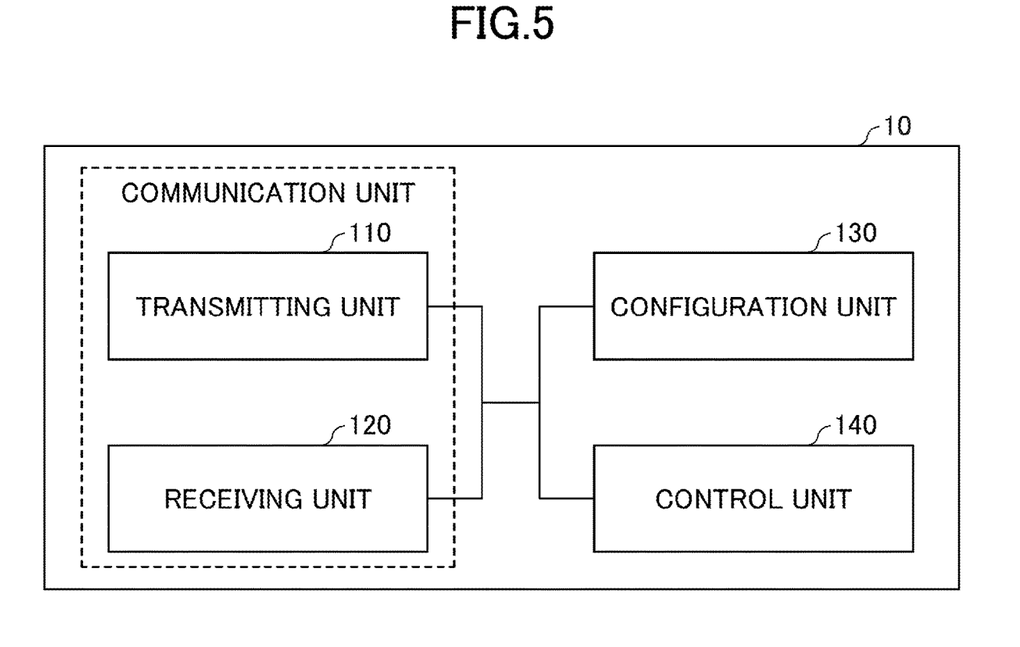
FIG. 5 is a diagram illustrating an example of a functional structure of the base station 10 according to the embodiment of the present invention.

FIG. 5 is a diagram illustrating an example functional structure of the base station 10. As illustrated in FIG. 5, the base station 10 includes a transmitting unit 110, a receiving unit 120, a configuration unit 130, and a control unit 140. The functional structure illustrated in FIG. 5 is only one example. If the operation according to the embodiment of the present invention can be performed, any functional categories and any functional unit names may be used. The transmitting unit 110 and the receiving unit 120 may be referred to as communication units.

The transmitting unit 110 includes a function for generating signals to be transmitted to the terminal 20 side and transmitting the signals wirelessly. The receiving unit 120 includes a function of receiving various signals transmitted from the terminal 20 and acquiring, for example, information about the higher layers from the received signals. The transmitting unit 110 has a function to transmit NR-PSS, NR-SSS, NR-PBCH, DL/UL control signals, DL data, and the like to the terminal 20. Furthermore, the transmitting unit 110 transmits the configuration information described in the embodiment and the like.

The configuration unit 130 stores the configuration information prepared in advance and various configuration information to be transmitted to the terminal 20 in a storage device, and reads the information from the storage device as needed. The control unit 140 controls, for example, the entirety of the base station 10 including control relating to signal transmission and reception, and so forth. Note that a functional unit relating to signal transmission in the control unit 140 may be included in the transmitting unit 110, and a functional unit relating to signal reception in the control unit 140 may be included in the receiving unit 120. The transmitting unit 110 and the receiving unit 120 may be referred to as a transmitter and a receiver, respectively.

<Terminal 20>

Figure 6:
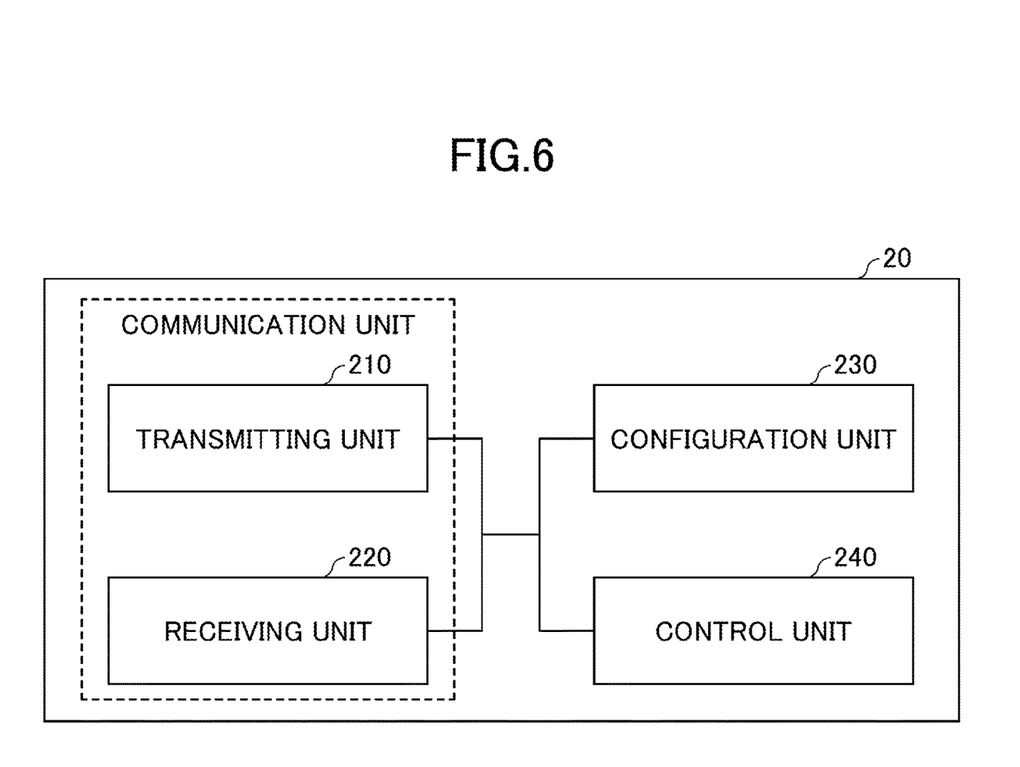
FIG. 6 is a diagram illustrating an example of a functional structure of the terminal 20 according to the embodiment of the present invention.

FIG. 6 is a diagram illustrating an example functional structure of the terminal 20. As illustrated in FIG. 6, the terminal 20 includes a transmitting unit 210, a receiving unit 220, a configuration unit 230, and a control unit 240. The functional structure illustrated in FIG. 6 is only one example. If the operation according to the embodiment of the present invention can be performed, any functional categories and functional unit names may be used. The transmitting unit 210 and the receiving unit 220 may be referred to as communication units.

The transmitting unit 210 generates transmission signals from the transmission data and transmits the transmission signals wirelessly. The receiving unit 220 receives various signals wirelessly and acquires signals of higher layers from the received signal of the physical layer. The transmitting unit 210 transmits HARQ-ACK, and the receiving unit 220 receives the configuration information described in the embodiment.

The configuration unit 230 stores various configuration information received from the base station 10 by the receiving unit 220 in the storage device, and reads the stored configuration information from the storage device as needed. The configuration unit 230 also stores the configuration information that is prepared in advance. The control unit 240 controls the entire terminal 20 including control relating to signal transmission and reception. Note that a functional unit relating to signal transmission in the control unit 240 may be included in the transmitting unit 210, and a functional unit relating to signal reception in the control unit 240 may be included in the receiving unit 220. Also, the transmitting unit 210 and the receiving unit 220 may be referred to as a transmitter and a receiver, respectively.

(Hardware Structure)

The block diagrams (FIG. 5 and FIG. 6) used in the description of the above embodiment illustrate blocks of functional units. These functional blocks (components) are implemented by any combination of hardware and/or software. In addition, the method of implementing each functional block is not particularly limited. That is, each functional block may be implemented by using a single device that is physically or logically combined, or two or more devices that are physically or logically separated may be directly or indirectly connected (for example, by using a cable, radio, etc.) and each functional block may be implemented using these multiple devices. The functional blocks may be implemented by combining software with the device or devices.

The functions include, but are not limited to, judgment, determination, decision, calculation, computation, processing, derivation, research, search, verification, reception, transmission, output, access, resolution, selection, choosing, establishment, comparison, assumption, expectation, deeming, broadcasting, notifying, communicating, forwarding, configuring, reconfiguring, allocating, mapping, and assigning. For example, a functional block (component) that works a transmission function is referred to as a transmitting unit or a transmitter. In either case, as described above, the method of implementation is not particularly limited.

Figure 7:
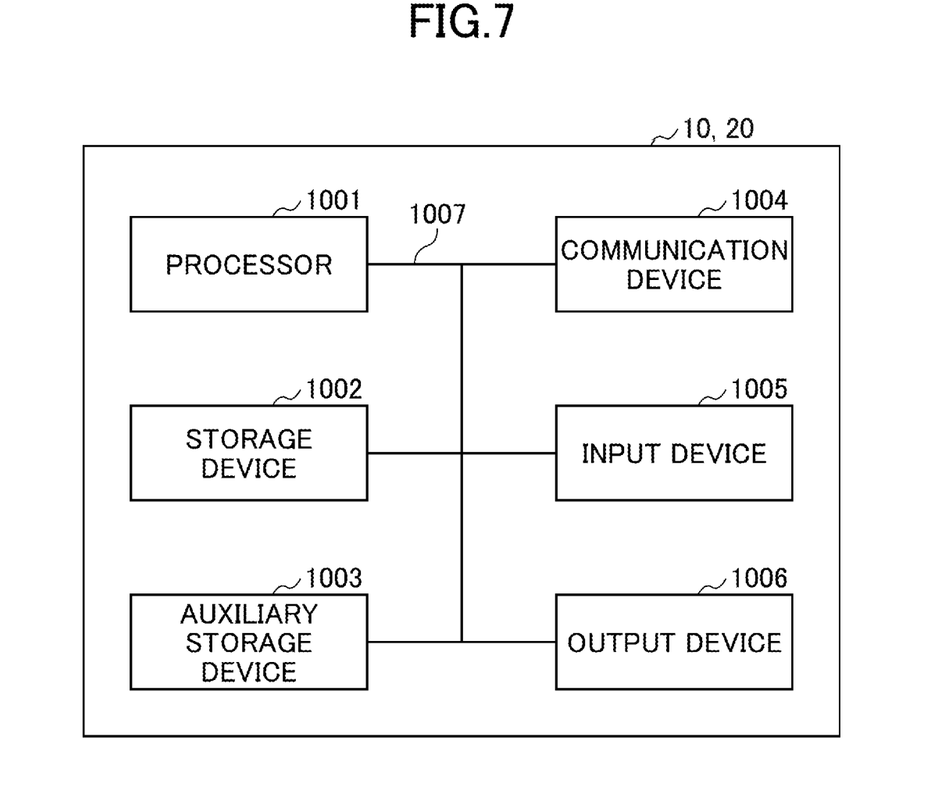
FIG. 7 is a diagram illustrating an example of a hardware structure of the base station 10 or the terminal according to the embodiment of the present invention.

For example, the base station 10, the terminal 20, and so forth, according to the embodiment of the present disclosure may function as a computer for processing the wireless communication method of the present disclosure. FIG. 7 is a diagram illustrating an example hardware structure of the base station 10 and the terminal 20 according to the embodiment of the present disclosure. The base station 10 and the terminal 20 described above may be physically configured as a computer device including a processor 1001, a storage device 1002, an auxiliary storage device 1003, a communication device 1004, an input device 1005, an output device 1006, a bus 1007, and the like.

In the following description, the term "apparatus" can be read as circuit, device, unit, and so forth. The hardware structure of the base station 10 and the terminal 20 may be configured to include one or more of the devices illustrated in the drawings or may be configured without some of the devices.

The functions of the base station 10 and the terminal 20 are realized by performing operations by the processor 1001 by reading predetermined software (programs) on hardware such as the processor 1001 and the storage device 1002, and controlling communication by the communication device 1004 and controlling at least one of reading and writing of data in the storage device 1002 and the auxiliary storage device 1003.

The processor 1001 operates, for example, an operating system to control the entire computer. The processor 1001 may be composed of a central processing unit (CPU) including an interface with peripheral devices, a control device, an arithmetic device, a register, and the like. For example, the above-described control unit 140, control unit 240, and the like may be implemented by the processor 1001.

The processor 1001 reads out programs (program codes), software modules, data, or the like from at least one of the auxiliary storage device 1003 and the communication device 1004 to the storage device 1002, and performs various processing in accordance with the above. As for the programs, programs that cause the computer to execute at least part of the operations described in the above embodiment may be used. For example, the control unit 140 of the base station 10 illustrated in FIG. 5 may be stored in the storage device 1002 and implemented by control programs operating in the processor 1001. For example, the control unit 240 of the terminal 20 illustrated in FIG. 6 may be stored in the storage device 1002 and implemented by control programs operating in the processor 1001. Although the foregoing processes have been described and executed by one processor 1001, they may be executed simultaneously or sequentially by two or more processors 1001. The processor 1001 may be implemented by one or more chips. The programs may be transmitted from the network via a telecommunication line.

The storage device 1002 is a computer-readable recording medium and may be composed of at least one of, for example, a ROM (Read Only Memory), an EPROM (Erasable Programmable ROM), an EEPROM (Electrically Erasable Programmable ROM), a RAM (Random Access Memory), and the like. The storage device 1002 may be referred to as a register, cache, main memory (main storage device), or the like. The storage device 1002 can store programs (program codes), software modules, and so forth, executable to implement the communication method according to the embodiment of the present disclosure.

The auxiliary storage device 1003 is a computer-readable recording medium and may be composed of at least one of an optical disk, such as a CD-ROM (Compact Disc ROM), a hard disk drive, a flexible disk, a magneto-optical disk (for example, a compact disk, a digital versatile disk, a Blu-ray disk (registered trademark), etc.), a smart card, a flash memory (for example, a card, a stick, a key drive), a floppy disk (registered trademark), a magnetic strip, and the like. The storage medium described above may be, for example, a database, a server, or other suitable medium that includes at least one of a storage device 1002 and an auxiliary storage device 1003.

The communication device 1004 is hardware (a transceiving device) for performing communication between computers via at least one of a wired network and a wireless network, and is also referred to as a network device, a network controller, a network card, a communication module, or the like. The communication device 1004 may be composed of a high frequency switch, a duplexer, a filter, a frequency synthesizer, or the like, for example, to implement at least one of frequency division duplex (FDD) and time division duplex (TDD). For example, the transmitting/receiving antenna, the amplifier unit, the transceiving unit, the transmission line interface, and the like may be implemented by the communication device 1004. The transceiving unit may be physically or logically isolated, respective implementations of a transmitting unit and a receiving unit.

The input device 1005 is an input device (for example, a keyboard, a mouse, a microphone, a switch, a button, a sensor, etc.) that accepts external input. The output device 1006 is an output device (for example, a display, a speaker, an LED lamp, etc.) that implements external output. The input device 1005 and the output device 1006 may have an integral structure (for example, a touch panel).

Each device, such as the processor 1001 and the storage device 1002, is connected by a bus 1007 for communicating information. The bus 1007 may be constructed using a single bus or may be constructed using different buses between devices.

The base station 10 and the terminal 20 may also include hardware such as a microprocessor, a digital signal processor (DSP), an ASIC (Application Specific Integrated Circuit), a PLD (Programmable Logic Device), an FPGA (Field Programmable Gate Array), and so forth, and some or all of the functional blocks may be implemented by the hardware. For example, the processor 1001 may be implemented using at least one of these hardware components.

Summary of Embodiment

As described above, according to the embodiment of the present invention, a terminal is provided. The terminal has: a communication unit configured to perform communication to which dual connectivity is applied with a base station; a receiving unit configured to receive, from the base station, signaling indicating an indication to perform activation of a secondary cell group and signaling indicating an indication to perform deactivation of the secondary cell group; and a control unit configured to perform the deactivation of the secondary cell group and perform switching to a band including a synchronization signal, in a case where the receiving unit receives the signaling indicating the indication to perform the deactivation of the secondary cell group.

With the above configuration, by switching beforehand the band to a narrowband BWP including an SSB when the SCG is caused to transition to the deactivated state, the terminal 20 can receive a PDCCH by skipping a random access procedure when the SCG is caused to transition to the activated state. That is, it is possible to reduce a delay when performing secondary cell group re-activation during the dual connectivity communication in a wireless communication system.

In a case where the receiving unit receives the signaling indicating the indication to perform the activation of the secondary cell group, the control unit may perform the activation of the secondary cell group without executing the random access procedure, and the receiving unit may receive a control channel in a band including the synchronization signal. With this configuration, by switching beforehand the band to the narrowband BWP including the SSB when the SCG is caused to transition to the deactivated state, the terminal 20 can receive the PDCCH by skipping the random access procedure when the SCG is caused to transition to the activated state.

The receiving unit may receive information indicating an indication to perform switching to the band including the synchronization signal together with the signaling indicating the indication to perform the deactivation of the secondary cell group. With this configuration, by switching beforehand the band to the narrowband BWP including the SSB when the SCG is caused to transition to the deactivated state, the terminal 20 can receive the PDCCH by skipping the random access procedure when the SCG is caused to transition to the activated state.

The control unit may perform switching to another band, based on information included in the control channel. With this configuration, by switching beforehand the band to the narrowband BWP including the SSB when the SCG is caused to transition to the deactivated state, the terminal 20 can receive the PDCCH to switch to a desired wideband by skipping the random access procedure when the SCG is caused to transition to the activated state.

Furthermore, according to the embodiment of the present invention, there is provided a communication method executed by a terminal. The communication method includes: performing communication to which dual connectivity is applied with a base station; receiving, from the base station, signaling indicating an indication to perform activation of a secondary cell group and signaling indicating an indication to perform deactivation of the secondary cell group; and performing the deactivation of the secondary cell group and performing switching to a band including a synchronization signal, when the signaling indicating the indication to perform the deactivation of the secondary cell group is received.

With the above configuration, by switching beforehand the band to the narrowband BWP including the SSB when the SCG is caused to transition to the deactivated state, the terminal 20 can receive the PDCCH by skipping the random access procedure when the SCG is caused to transition to the activated state. That is, it is possible to reduce a delay when performing secondary cell group re-activation during the dual connectivity communication in a wireless communication system.

Notes on Embodiment

An example embodiment of the present invention has been described above, but the disclosed invention is not limited to the above embodiment, and those skilled in the art would understand that there may be various modified examples, revised examples, alternative examples, substitution examples, and the like. In order to facilitate understanding of the invention, specific numerical values have been used for description, but the numerical values are merely examples, and any suitable values may be used unless otherwise specified. The classification of items in the above description is not essential to the present invention. Matters described as two or more items may be combined if necessary, and a matter described as one item may be applied to another item (as long as there is no contradiction). The boundary between functional units or processing units in a functional block diagram does not necessarily correspond to the boundary between physical parts. Operations of a plurality of functional units may be performed physically by one component, or an operation of one functional unit may be performed physically by a plurality of components. In the processing procedure described in the embodiment, the order of the processes may be changed as long as there is no contradiction. For the sake of convenience of processing description, the base station 10 and the terminal 20 are described using functional block diagrams, but such devices may be implemented by hardware, software, or a combination thereof. Software executed by the processor included in the base station 10 according to the embodiment of the present invention and software executed by the processor included in the terminal 20 according to the embodiment of the present invention may be stored in a RAM (Random Access Memory), a flash memory, a ROM (Read-Only Memory), an EPROM, an EEPROM, a register, an HDD (Hard Disk Drive), a removable disk, a CD-ROM, a database, a server, or any other appropriate storage medium.

Furthermore, notification of information is not limited to the aspect or embodiment described in the present disclosure and may be provided by using any other method. For example, the notification of information may be provided by physical layer signaling (for example, DCI (Downlink Control Information) or UCI (Uplink Control Information)), higher layer signaling (for example, RRC (Radio Resource Control) signaling, MAC (Medium Access Control) signaling, broadcast information (MIB (Master Information Block), SIB (System Information Block), etc.), other signals, or a combination thereof. Furthermore, RRC signaling may be referred to as an RRC message and may be, for example, an RRC connection setup message, an RRC connection reconfiguration message, or the like.

Each aspect and embodiment described in the present disclosure may be applied to at least one of LTE (Long Term Evolution), LTE-A (LTE-Advanced), SUPER 3G, IMT-Advanced, 4G (4th Generation mobile communication system), 5G (5th Generation mobile communication system), FRA (Future Radio Access), NR (New Radio), W-CDMA (registered trademark), GSM (registered trademark), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), a system using any other appropriate system, and next generation systems extended based on these standards. Furthermore, a plurality of systems (for example, a combination of at least one of LTE and LTE-A with 5G) may be combined to be applied.

The order of the processing procedures, the order of the sequences, the order of the flowcharts, and the like of the respective aspect/embodiment described in this specification may be changed, provided that there is no contradiction. For example, the method described in the present disclosure presents elements of various steps with an example order and is not limited to the presented, specific order.

In this specification, a specific operation to be performed by the base station 10 may be performed by an upper node in some cases. In the network including one or more network nodes including the base station 10, various operations performed for communication with the terminal 20 can be obviously performed by at least one of the base station 10 and any network node (for example, an MME, an S-GW, or the like is considered, but it is not limited thereto) other than the base station 10. A case has been illustrated above in which there is one network node other than the base station 10. The one network node may be a combination of a plurality of other network nodes (for example, MME and S-GW).

Information, a signal, or the like described in the present disclosure may be output from a higher layer (or from a lower layer) to a lower layer (or to a higher layer). Information, a signal, or the like described in the present disclosure may be input and output via a plurality of network nodes.

Input and output information and the like may be stored in a specific place (for example, a memory), or may be managed by using a management table. Input and output information and the like may be overwritten, updated, or added. Output information and the like may be deleted. Input information and the like may be transmitted to other devices.

The determination in the present disclosure may be made in accordance with a value (0 or 1) represented by one bit, may be made in accordance with a Boolean value (Boolean: true or false), or may be made by a comparison of numerical values (for example, a comparison with a predetermined value).

Software should be broadly interpreted to mean a command, a command set, a code, a code segment, a program code, a program, a subprogram, a software module, an application, a software application, a software package, a routine, a subroutine, an object, an executable file, an execution thread, a procedure, a function, and the like, regardless of whether software is called software, firmware, middleware, a microcode, a hardware description language, or any other name.

Furthermore, software, commands, information, and the like may be transmitted and received via a transmission medium. For example, when software is transmitted from a web site, a server, or any other remote source using at least one of a wired technology (such as a coaxial cable, a fiber optic cable, a twisted pair, or a DSL (Digital Subscriber Line)) and a radio technology (such as infrared rays or a microwave), at least one of these wired technology and radio technology is included in a definition of a transmission medium.

Information, signals, and the like described in the present disclosure may be expressed using any one of a variety of different techniques. For example, data, instructions, commands, information, signals, bits, symbols, chips, and the like which are mentioned throughout the above description may be expressed by voltages, currents, electromagnetic waves, magnetic fields or magnetic particles, optical fields or photons, or any combination thereof.

The terms described in the present disclosure and the terms necessary for understanding the present disclosure may be replaced with terms having the same or similar meanings. For example, at least one of a channel and a symbol may be a signal (signaling). Furthermore, a signal may be a message. Furthermore, a component carrier (CC: Component Carrier) may be referred to as a "carrier frequency", a "cell", a "frequency carrier", or the like.

The terms "system" and "network" used in the present disclosure are interchangeable.

Furthermore, the information, parameters, and the like described in the present disclosure may be expressed by using absolute values, may be expressed by using relative values from predetermined values, or may be expressed by using any other corresponding information. For example, the radio resources may be those indicated by indices.

The names used for the above-described parameters are not limited names in any point of view. Furthermore, mathematical formulas or the like using the parameters may be different from those explicitly disclosed in the present disclosure. Since various channels (for example, PUCCH, PDCCH, etc.) and information elements can be identified by any suitable names, various names assigned to the various channels and the information elements are not limited names in any point of view.

In the present disclosure, the terms "base station (BS: Base Station) ", "radio base station", "base station, "fixed station", "NodeB", "eNodeB (eNB) ", "gNodeB (gNB) ", "access point", "transmission point", "reception point", "transmission/reception point", "cell", "sector", "cell group", "carrier", "component carrier", and the like can be used interchangeably. The base station may also be referred to by a term such as a macrocell, a small cell, a femtocell, and a picocell.

The base station can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (RRH: Remote Radio Head)). The term "cell" or "sector" refers to the whole or a part of the coverage area of at least one of the base station and the base station subsystem that performs a communication service in the coverage.

In the present disclosure, the terms "mobile station (MS) ", "user terminal", "user equipment (UE) ", "terminal", and the like can be used interchangeably.

The mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be also referred to as a transmitting device, a receiving device, a communication device, or the like. At least one of the base station and the mobile station may be a device installed in a mobile body, a mobile body itself, or the like. The mobile body may be a vehicle (for example, a car, an airplane, or the like), an unmanned body that moves (for example, a drone, an autonomous car, or the like), or a robot (manned type or unmanned type). At least one of the base station and the mobile station includes a device that need not move during communication operation. For example, at least one of the base station and the mobile station may be an Internet of Things (IoT) device such as a sensor.

Furthermore, the base station in the present disclosure may be replaced by the user terminal. For example, the aspect/embodiment of the present disclosure may be applied to a configuration in which communication between the base station and the user terminal is replaced by communication between multiple terminals 20 (such communication may be referred to as D2D (Device-to-Device), V2X (Vehicle-to-Everything), etc.). In this case, the terminals 20 may have the functions of the above-described base station 10. The phrases "uplink" and "downlink" may also be replaced by phrases corresponding to terminal-to-terminal communication (for example, "side"). For example, an uplink channel, a downlink channel, or the like may be replaced by a side channel.

Similarly, the user terminal in the present disclosure may be replaced with the base station. In this case, the base station may have the functions of the above-described user terminal.

The terms "determination (determining)" and "decision (determining)" used in the present specification may include various types of operations. The "determination" and "decision" may include deeming "judging", "calculating", "computing", "processing", "deriving", "investigating", "looking up, searching, or inquiry (for example, searching in a table, a database, or another data structure) ", "searching", "inquiring", or "ascertaining" as "determining" and/or "deciding". Furthermore, the "determination" and "decision" may include deeming "receiving (for example, receiving information) ", "transmitting (for example, transmitting information) ", "inputting", "outputting", or "accessing (for example, accessing data in a memory) "as "determining" and/or "deciding". Furthermore, the "determination" and "decision" may include deeming "resolving", "selecting", "choosing", "establishing", or "comparing" as "determining" and/or "deciding". Namely, the "determination" and "decision" may include deeming an operation as "determining" and/or "deciding". Furthermore, "determining" may be replaced with "assuming", "expecting", "considering", or the like.

The terms "connected", "coupled", or variations thereof may mean any direct or indirect connection or coupling between two or more elements and may include the presence of one or more intermediate elements between two elements which are "connected" or "coupled". The coupling or the connection between the elements may be physical, logical, or a combination thereof. For example, "connection" may be replaced with "access". In a case of using in the present disclosure, two elements may be considered to be "connected" or "coupled" with each other using at least one of one or more electric wires, cables and a printed electrical connection or using electromagnetic energy having a wavelength in a radio frequency domain, a microwave region, or a light (both visible and invisible) region as non-limiting and non-exhaustive examples.

A reference signal may be abbreviated as RS (Reference Signal) and may be referred to as a pilot, depending on the standard that is applied.

The phrase "based on" used in the present disclosure is not limited to "based only on" unless otherwise stated. In other words, the phrase "based on" means both "based only on" and "based at least on".

Any reference to an element using a designation such as "first" or "second", used in the present disclosure, does not generally restrict quantities or the order of those elements. Such designation can be used in the present disclosure as a convenient method of distinguishing between two or more elements. Thus, reference to the first and second elements does not mean that only two elements can be adopted there, or the first element must precede the second element in a certain way.

Furthermore, "means" in the configuration of each of the above devices may be replaced with "unit", "circuit", "device", or the like.

When "include", "including", and variations thereof are used in the present disclosure, these terms are intended to be comprehensive, similar to the term "provided with (comprising)". Furthermore, the term "or" used in the present disclosure is intended not to be an exclusive OR.

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology.

Numerology may be a communication parameter applied to at least one of transmission and reception of a certain signal or channel. For example, numerology may indicate at least one of subcarrier spacing (SCS), the bandwidth, the symbol length, the cyclic prefix length, the transmission time interval (TTI), the number of symbols per TTI, the radio frame configuration, a specific filtering process performed in the frequency domain by a transceiver, a specific windowing process performed in the time domain by a transceiver, and the like.

A slot may include one or more symbols (OFDM (Orthogonal Frequency Division Multiplexing) symbols, SC-FDMA (Single Carrier Frequency Division Multiple Access) symbols, etc.) in the time domain. A slot may be a time unit based on numerology.

A slot may include a plurality of mini slots. Each mini slot may include one or more symbols in the time domain. Furthermore, a mini slot may be referred to as a sub-slot. A mini slot may include fewer symbols than a slot. PDSCH (or PUSCH) that is transmitted in a unit of time greater than a mini slot may be referred to as PDSCH (or PUSCH) mapping type A. PDSCH (or PUSCH) that is transmitted using a mini slot may be referred to as PDSCH (or PUSCH) mapping type B.

Any one of a radio frame, a subframe, a slot, a mini slot, and a symbol indicates a time unit for transmitting a signal. As a radio frame, a subframe, a slot, a mini slot, and a symbol, different names corresponding to them may be used.

For example, one subframe may be referred to as a transmission time interval (TTI), or a plurality of consecutive subframes may be referred to as a TTI, or one slot or one mini slot may be referred to as a TTI. In other words, at least one of the subframe and the TTI may be a subframe (1 ms) in conventional LTE, may be a period shorter than 1 ms (for example, 1 to 13 symbols), or may be a period longer than 1 ms. A unit representing the TTI may be referred to as a slot, a mini slot, or the like, instead of a subframe.

Here, for example, the TTI refers to a minimum time unit of scheduling in wireless communication. For example, in an LTE system, the base station performs scheduling of allocating radio resources (frequency bandwidth, transmission power, or the like which can be used in each terminal 20) to each terminal 20 in units of TTIs. The definition of the TTI is not limited thereto.

The TTI may be a transmission time unit such as a channel-coded data packet (transport block), a code block, or a codeword, or may be a processing unit of, for example, scheduling or link adaptation. Furthermore, when a TTI is provided, the time interval (for example, the number of symbols) in which a transport block, a code block, a codeword, or the like is actually mapped, may be shorter than the TTI.

When one slot or one mini slot is referred to as a TTI, one or more TTIs (that is, one or more slots or one or more mini slots) may be a minimum time unit of scheduling. Furthermore, the number of slots (the number of mini slots) forming the minimum time unit of scheduling may be controlled.

A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than a common TTI may be referred to as a reduced TTI, a short TTI, a partial or fractional TTI, a reduced subframe, a short subframe, a mini slot, a sub slot, a slot, or the like.

Furthermore, a long TTI (for example, a normal TTI, a subframe, etc.) may be replaced with a TTI having a time length exceeding 1 ms, and a short TTI (for example, a reduced TTI, etc.) may be replaced with a TTI having a TTI length that is shorter than a TTI length of a long TTI and that is longer than or equal to 1 ms.

The resource block (RB) is a resource allocation unit in the time domain and the frequency domain, and may include one or more consecutive subcarriers in the frequency domain. The number of subcarriers included in an RB may be the same, irrespective of the numerology and may be, for example, 12. The number of subcarriers included in an RB may be determined based on numerology.

Furthermore, the time field of an RB may include one or more symbols and may have a length of one slot, one mini slot, one subframe, or one TTI. One TTI, one subframe, or the like may be formed with one or more resource blocks.

Furthermore, one or more RBs may be referred to as a physical resource block (PRB: Physical RB), a subcarrier group (SCG), a resource element group (REG), a PRB pair, an RB pair, or the like.

Furthermore, a resource block may be formed with one or more resource elements (REs). For example, one RE may be a radio resource field of one subcarrier and one symbol.

A bandwidth part (BWP) (which may be referred to as a partial bandwidth or the like) may indicate a subset of consecutive common resource blocks (common RBs) for a certain numerology in a certain carrier. Here, a common RB may be specified by an index of an RB based on a common reference point of a carrier. A PRB may be defined in a BWP and numbered in the BWP.

The BWP may include BWP for UL (UL BWP) and BWP for DL (DL BWP). In the terminal 20, one or more BWPs may be configured in one carrier.

At least one of configured BWPs may be active, and the terminal 20 need not assume that predetermined signals/channels are transmitted and received outside the active BWP. Furthermore, a "cell", a "carrier", or the like in the present disclosure may be replaced with a "BWP".

Structures of the radio frame, the subframe, the slot, the mini slot, and the symbol are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the cyclic prefix (CP) length, and the like can be variously changed.

In the present disclosure, for example, when an article such as "a", "an", or "the" in English is added by a translation, the present disclosure may include a case in which a noun following the article is plural.

In the present disclosure, "A and B are different" may mean "A and B are different from each other". However, this may also mean "A and B are different from C". Terms such as "separated" or "combined" may be interpreted like the interpretation of "different".

Each aspect/embodiment described in the present disclosure may be used alone, in combination, or may be switched in accordance with the implementation. Furthermore, notification of predetermined information (for example, notification of "being X") is not limited to notification performed explicitly, but may be performed implicitly (for example, not notifying the predetermined information).

Although the present disclosure is described above in detail, it is obvious to those skilled in the art that the present disclosure is not limited to the embodiment described in the present disclosure. The present disclosure may be implemented as revised and modified embodiments without departing from the gist and scope of the present disclosure as set forth in the accompanying claims. Accordingly, the description of the present disclosure is for the purpose of illustration and does not have any restrictive meaning to the present disclosure.

DESCRIPTION OF THE REFERENCE NUMERALS

10 Base station
110 Transmitting unit

120 Receiving unit
130 Configuration unit
140 Control unit
20 Terminal
210 Transmitting unit
220 Receiving unit
230 Configuration unit
240 Control unit
30 Core network
1001 Processor
1002 Storage device
1003 Auxiliary storage device
1004 Communication device
1005 Input device
1006 Output device

The invention claimed is:

1. A terminal comprising:
    a receiving unit configured to receive a message for indicating deactivation of a secondary cell group in communication using dual connectivity; and
    a control unit configured to deactivate the secondary cell group in the communication based on reception of the message, wherein
    the control unit switches a bandwidth part in downlink to a first active bandwidth part including a synchronization signal in a case of deactivating the secondary cell group in the communication.

2. A communication method performed by a terminal, the communication method comprising:
    receiving a message for indicating deactivation of a secondary cell group in communication using dual connectivity;
    deactivating the secondary cell group in the communication based on reception of the message; and
    switching a bandwidth part in downlink to a first active bandwidth part including a synchronization signal in a case of deactivating the secondary cell group in the communication.

3. A base station comprising:
    a transmitting unit configured to transmit a message for indicating deactivation of a secondary cell group in communication using dual connectivity; and
    a control unit configured to deactivate the secondary cell group in the communication based on transmission of the message, wherein
    the control unit switches a bandwidth part in downlink to a first active bandwidth part including a synchronization signal in a case of deactivating the secondary cell group in the communication.

4. A wireless communication system comprising:
    a terminal; and
    a base station, wherein
    the terminal includes:
        a receiving unit configured to receive a message for indicating deactivation of a secondary cell group in communication using dual connectivity; and
        a control unit configured to deactivate the secondary cell group in the communication based on reception of the message, and
    the base station includes:
        a transmitting unit configured to transmit the message; and
        a control unit configured to deactivate the secondary cell group in the communication based on the transmission, wherein
        the control unit switches a bandwidth part in downlink to a first active bandwidth part including a synchronization signal in a case of deactivating the secondary cell group in the communication.

* * * * *